July 4, 1939.  R. R. McLEOD  2,164,619
APPARATUS FOR USE WITH COFFEE BREWERS
Filed Aug. 2, 1937
FIG.1
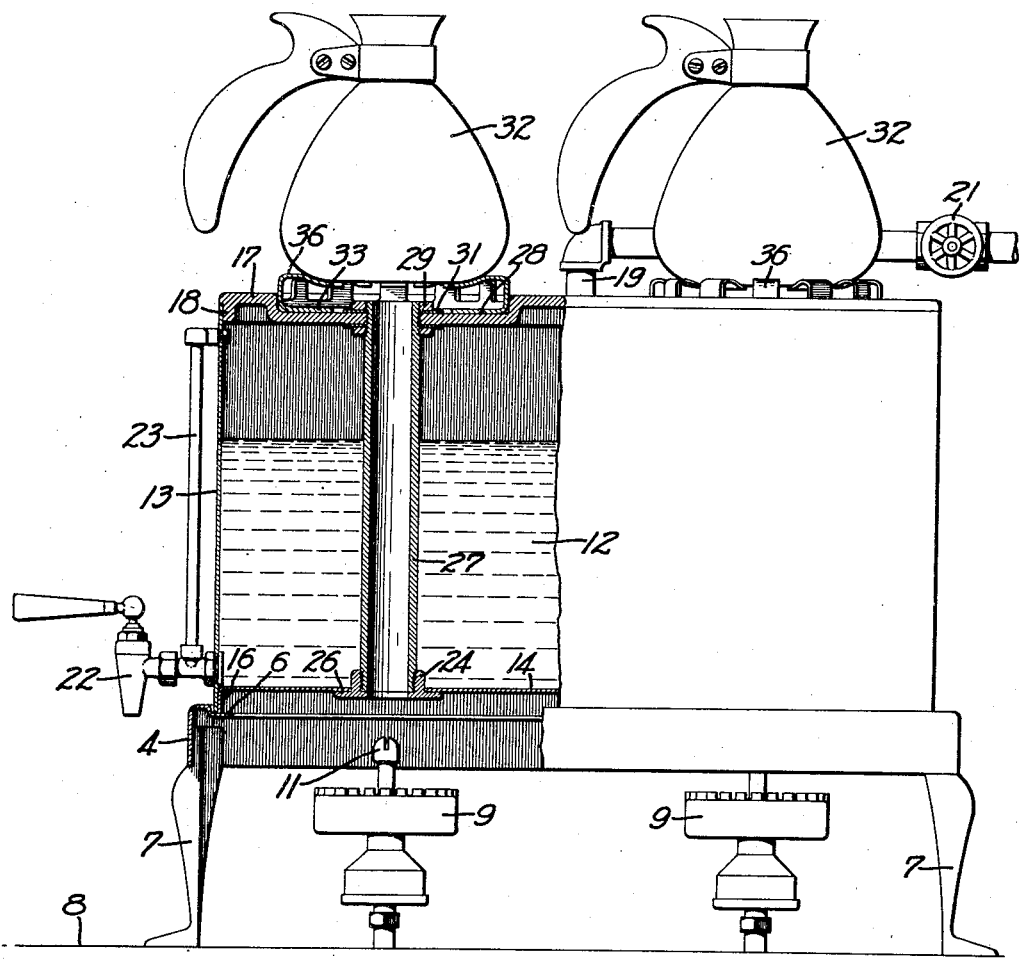
FIG.2  FIG.3
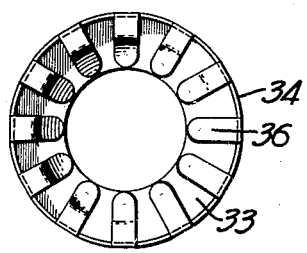 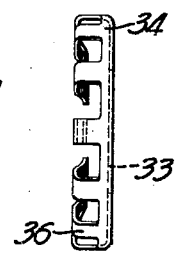
INVENTOR
Robert R. McLeod
BY
Harry G. Schroeder
ATTORNEY Patented July 4, 1939

2,164,619

UNITED STATES PATENT OFFICE 2,164,619

APPARATUS FOR USE WITH COFFEE BREWERS

Robert R. McLeod, Oakland, Calif.

Application August 2, 1937, Serial No. 156,926

2 Claims. (Cl. 126—215)

This invention relates to apparatus useful in the preparation of coffee or other similarly prepared beverages.

It is an object of the invention to provide an apparatus for use particularly with the now popular type of vacuum coffee makers which will serve as a heater for the coffee after it is brewed and as a heater for the water used in its preparation.

Another object of the invention is to provide, in combination with the apparatus described above, a cushion support for the glass coffee dispensers which will insure against breakage of the latter should they be set down hard.

The invention possesses other object and features of advantage, some of which, together with the foregoing, will be specifically set forth in the detailed description of the invention hereunto annexed. It is to be understood that the invention is not to be limited to the particular form thereof shown and described as various other embodiments thereof may be employed within the scope of the appended claims.

Referring to the drawing:

Figure 1 is a side elevational view, partly in vertical section so as to more clearly disclose the interior construction of the apparatus of my invention.

Figures 2 and 3 are, respectively, a top plan view and a side elevational view of the cushion for the coffee container.

In detail, the apparatus comprises a centrally apertured rectangular base having a rim 4 provided in its top surface with a depression 6 and fitted with legs 7 which space the base above the surface 8 of the support upon which it may be mounted. Gas burners of the type comprising a main burner 9 and a pilot light 11 are positioned below the base. Mounted on the base is a tank, for containing a quantity of water 12, comprising a side wall 13, a bottom plate 14 having a peripheral flange 16 soldered or otherwise secured to the side wall along the lower edge of the latter, and a cover plate 17 having a marginal flange 18 which fits loosely within the top opening of the tank. Opening into the tank through the cover plate 17 is a supply pipe 19, through which water may be admitted to the tank, and a valve 21 is provided in the pipe so that the water flow may be controlled or stopped. A faucet 22 is provided, adjacent the bottom of the tank, through which the water 12 may be withdrawn, and a gauge glass 23 serves to indicate the height of the water remaining in the tank.

The bottom plate 14 is provided with apertures, centered over each of the burners, in each of which is mounted a centrally bored collar 24 having a flange 26, which is soldered or riveted to the tank bottom so as to provide a fluid-tight joint, and threads in the bore thereof which engage the threaded bottom end of a tubular duct 27 extending upwardly through the tank. The cover plate 17 has therein circular recesses 28, each of which is provided with a central aperture through which the threaded upper end of a duct 27 extends and nuts 29 and washers 31 are provided on the duct for rendering the connection of the latter with the cover plate fluid-tight. It will be seen that, as the cover plate is connected to the bottom plate through the medium of the ducts 27, no further means are necessary to maintain the former plate on the tank. Since there will be considerable steam generated within the tank when the water 12 is heated, the provision of a loose fit between the marginal flange 18 of the cover plate and the side wall 13 of the tank allows for venting of the tank to permit the steam to escape.

Seated within each of the cover plate recesses 28 is a cushion member which provides a support for the glass container 32 forming the bottom section of the well known type of vacuum coffee maker. This cushion member, which is shown in detail in Figures 2 and 3, comprises a centrally apertured bottom plate 33 of sheet metal having an upwardly extending peripheral rim 34 from the top edge of which extend radially inwardly toward the center of the plate 33, a plurality of resilient tabs 36 each of which is shaped to conform with the bottom curvature of the container 32 so that all of the tabs mutually provide a dished seat for supporting the container. Heretofore, in apparatus of this character, the receptacle, equivalent to the cushion member of the present invention, has been a solid casting possessing no resilience with the result that quite often, in setting down the container 32 a little harder than usual, the latter will, upon coming in contact with the unyielding receptacle, be broken and shower the user with scalding coffee. The provision of the resilient seat for the coffee container in the apparatus of my invention obviates this danger to a great extent.

In primarily heating the water 12, the containers 32 are removed and the main burners 9 are turned on until the water reaches the boiling point. The burners are then turned off leaving only the flame of the pilot lights 11. The containers 32 are then replaced. The products of combustion from the pilot light flames will pass upwardly through the ducts 27 causing a transference of some of their heat to the water 12 and maintaining the latter near the boiling point and then emerging from the upper end of the ducts and passing outwardly under the containers so that the coffee in the latter will be maintained in a heated condition.

Having thus described my invention in detail, what I claim as new is:

1. A support for a container to be heated over an end of a burner flue, comprising an annular member having thereon a plurality of curved resilient arms extending inwardly and each shaped to mutually provide a depression in which said container may be seated.

2. A support for a container to be heated over an end of a burner flue, comprising an annular member having thereon a plurality of curved resilient arms extending inwardly and each shaped to mutually provide a depression conforming in contour with a peripheral portion of said container and in which said container may be seated.

ROBERT R. McLEOD.